US006785011B1

(12) United States Patent
Cook

(10) Patent No.: US 6,785,011 B1
(45) Date of Patent: Aug. 31, 2004

(54) OPTICAL SENSOR ARRANGEMENT FOR START OF SCAN DETECTION AND IMPROVED VERTICAL BEAM ALIGNMENT RANGE

(75) Inventor: William Paul Cook, Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/527,179

(22) Filed: Mar. 16, 2000

(51) Int. Cl.⁷ .............................................. G06K 15/00
(52) U.S. Cl. ........................ 358/1.1; 347/248; 347/250
(58) Field of Search ........................... 358/1.1, 1.5, 1.7, 358/1.12, 1.18, 1.2–1.4, 1.6, 1.8–1.9, 1.11, 1.13–1.17, 514; 347/116, 248, 117, 118, 259, 233–239, 250, 255

(56) References Cited

U.S. PATENT DOCUMENTS

| | | | |
|---|---|---|---|
| 4,206,348 A | | 6/1980 | Davy et al. |
| 4,270,131 A | | 5/1981 | Tompkins et al. |
| 4,569,584 A | | 2/1986 | St. John et al. |
| 4,686,363 A | | 8/1987 | Schoon |
| 4,725,855 A | | 2/1988 | Arimoto et al. |
| 4,764,672 A | | 8/1988 | Wu et al. |
| 4,823,151 A | | 4/1989 | Miura |
| 4,845,358 A | | 7/1989 | Asada |
| 4,903,067 A | | 2/1990 | Murayama et al. |
| 5,032,852 A | * | 7/1991 | Fujii et al. ................... 346/157 |
| 5,072,244 A | | 12/1991 | Aoki et al. |
| 5,115,256 A | | 5/1992 | Miyagi et al. |
| 5,260,725 A | | 11/1993 | Hammond |
| 5,272,493 A | | 12/1993 | Hubble, III et al. |
| 5,291,273 A | | 3/1994 | Gelbart |
| 5,302,973 A | | 4/1994 | Costanza et al. |
| 5,319,444 A | | 6/1994 | Saitoh et al. |
| 5,319,537 A | | 6/1994 | Powers et al. |
| 5,351,264 A | | 9/1994 | Kato et al. |
| 5,381,167 A | | 1/1995 | Fujii et al. |
| 5,384,592 A | | 1/1995 | Wong |
| 5,452,073 A | | 9/1995 | Kataoka |
| 5,457,487 A | | 10/1995 | Sakaki et al. |
| 5,465,154 A | | 11/1995 | Levy |
| 5,477,330 A | | 12/1995 | Dorr |
| 5,525,809 A | | 6/1996 | Bolea |
| 5,530,242 A | | 6/1996 | Genovese |
| 5,539,719 A | * | 7/1996 | Motoi ........................ 369/112 |
| 5,583,557 A | | 12/1996 | Yamamoto et al. |
| 5,677,726 A | | 10/1997 | Fuse |
| 5,694,637 A | | 12/1997 | Yoshino et al. |
| 5,737,003 A | | 4/1998 | Moe et al. |
| 5,745,154 A | | 4/1998 | Nishizawa |
| 5,754,690 A | | 5/1998 | Jackson et al. |
| 5,790,255 A | | 8/1998 | Jackson et al. |
| 5,844,591 A | * | 12/1998 | Takamatsu et al. ......... 347/235 |
| 5,864,127 A | | 1/1999 | Jackson et al. |
| 5,864,404 A | | 1/1999 | Amorosi |
| 5,982,402 A | | 11/1999 | Yoshikawa et al. |

OTHER PUBLICATIONS

European Patent Office, "PCT International Search Report," Aug. 8, 2001, 7 pages.

* cited by examiner

Primary Examiner—Gabriel Garcia
Assistant Examiner—King Y. Poon
(74) Attorney, Agent, or Firm—Todd T. Taylor

(57) ABSTRACT

A laser beam position sensing arrangement using two similar sensors where, instead of the first sensor being aligned normal to the beam scan path, the angle which bisects the two sensors is aligned normal to the beam scan path. The average of times T1 and T2 at which the laser beam is incident the respective sensors is used for the horizontal or start of scan value, and the difference (T2−T1) is proportional to the vertical or process direction value. From the difference between the two determined times, the longitudinal beam position may be determined.

3 Claims, 3 Drawing Sheets

OPTICAL SENSOR ARRANGEMENT FOR START OF SCAN DETECTION AND IMPROVED VERTICAL BEAM ALIGNMENT RANGE

BACKGROUND OF THE INVENTION

1. Field of the invention

The present invention relates to image forming apparatus such as laser printers and more particularly to an arrangement for determining laser beam position.

2. Description of the Related Art

An in-line color laser image printing process where the media passes through four color developing stations in series will print the same speed as monochrome. The photo conductive drum exposures typically occur on all four colors at the same time. Both process and scan direction alignment of the four color developing stations is critical. The process location of each scanning laser beam must overlap to prevent color offset in the process direction. If one beam is out of synchronization with the others, the image in the corresponding color will be misaligned relative to the remaining color components, and the resulting image blurred. Each color should have an adjustment to correct for process direction misalignment because each color has a scanning laser beam following a separate optical path. Thermal changes will cause misalignment so the adjustment should be performed real time and not be just a one time manufacturing adjustment It is possible to utilize a sensor arrangement for two dimensional beam detection known as PSD or Position Sensitive Detection. In such an arrangement, two optical sensors are used. One functions as a start of scan sensor to detect the horizontal scan beam location. A second sensor may be added at an angle to the first, and the time delay between the two sensors used to determine the vertical beam position location or so-called process direction. Firmware processes this information and makes appropriate adjustments in the raster image. Such an arrangement has a disadvantage in that the second sensor must be longer than the first to achieve the same vertical detection range. If the second sensor is offset by an angle of 45 degrees, the second sensor will be nearly 1.5 times longer than the first, which will be more expensive and may not be feasible.

It is highly desirable to implement an in-line process using four scanning lasers. What is needed in the art is a sensor arrangement which is capable of a full PSD function with reasonable expense.

SUMMARY OF THE INVENTION

The invention provides apparatus for determining the coordinates of the location of a laser beam utilizing first and second laser light sensitive sensors which are disposed obliquely to one another.

The invention comprises, in one form thereof, a color printer having multiple laser printheads, each employing a laser beam which executes a scan pattern of repeated transverse scans along a corresponding line to form image information, and laser beam position sensing arrays for each printhead synchronizing operation of the printheads. Each position sensing array includes first and second elongated laser light sensitive sensors extending obliquely to one another and to the corresponding laser scan line.

An advantage of the present invention is that sensor length and cost are reduced, and/or the effective range of process detection is increased.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
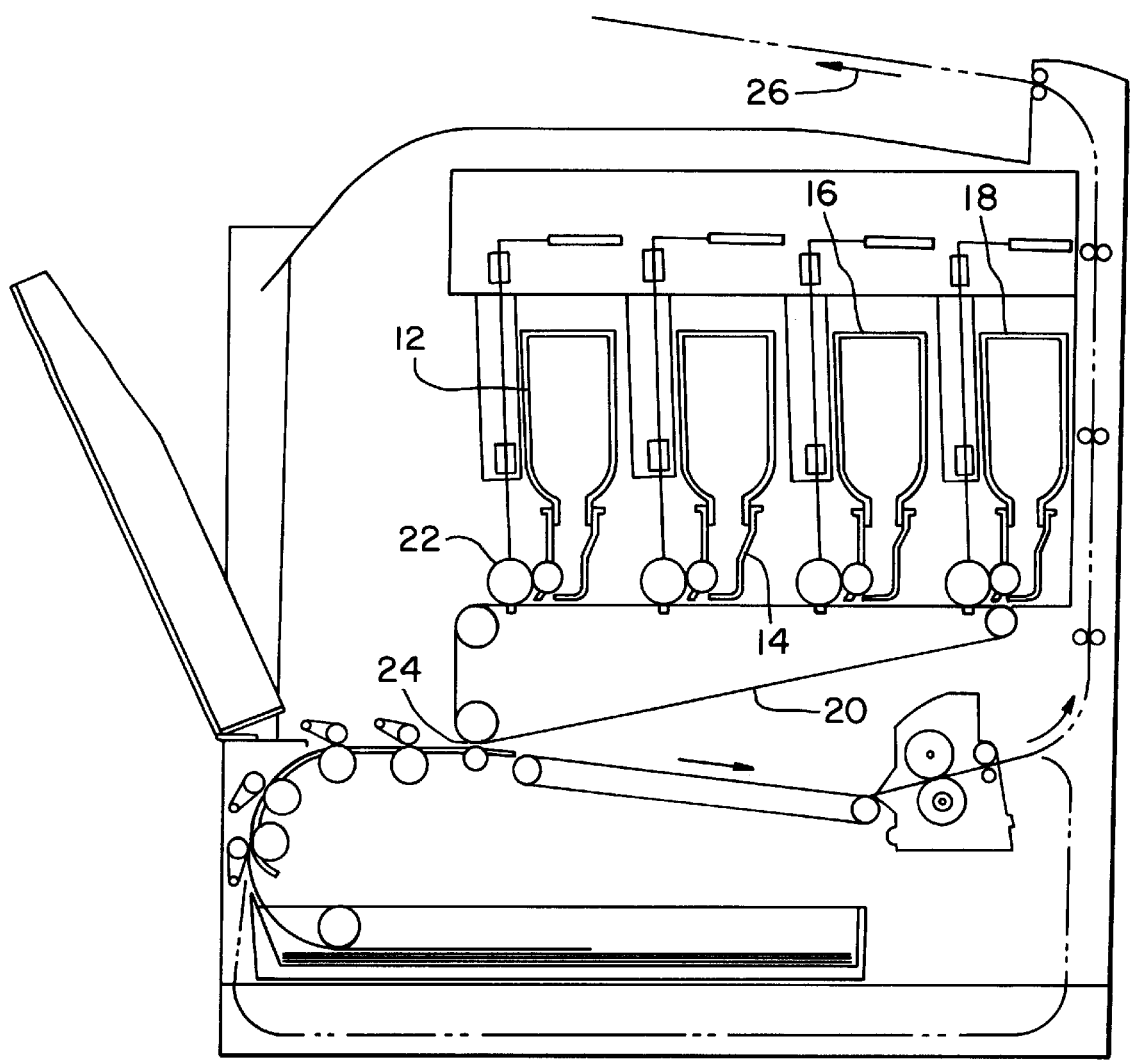
FIG. 1 is a generalized cross-sectional view of an embodiment of a laser printer having color capability utilizing four laser printheads in which the present invention finds particular utility.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings and particularly to FIG. 1, there is shown an embodiment of a laser printer having, for example, four laser printheads such as 12, 14, 16 and 18 aligned along the intermediate transfer member in the form of image transfer belt 20. Each of the printheads 12, 14, 16, and 18 develops an image on a corresponding photo conductive drum such as 22. Next, the image is developed with one of four-color toners. i.e. black, magenta, cyan, or yellow, and transferred successively onto the image transfer belt 20. Finally, the image is transferred to a substrate (paper or transparency) at nip 24, fused and processed out of the printer as indicated by the arrow 26. Each laser printhead executes a scan pattern of repeated transverse scans along the corresponding photo conductive drum as that drum rotates and includes a beam position determining arrangement of the type illustrated in FIGS. 2 and 3.

Figure 2:
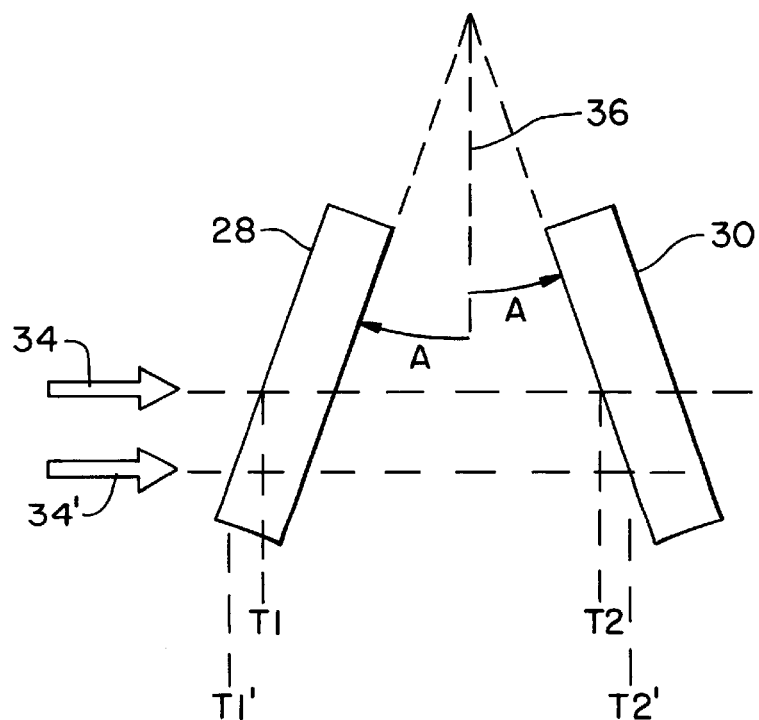
FIG. 2 is a simplified front view of one laser beam position sensing arrangement according to the present invention.
Figure 3:
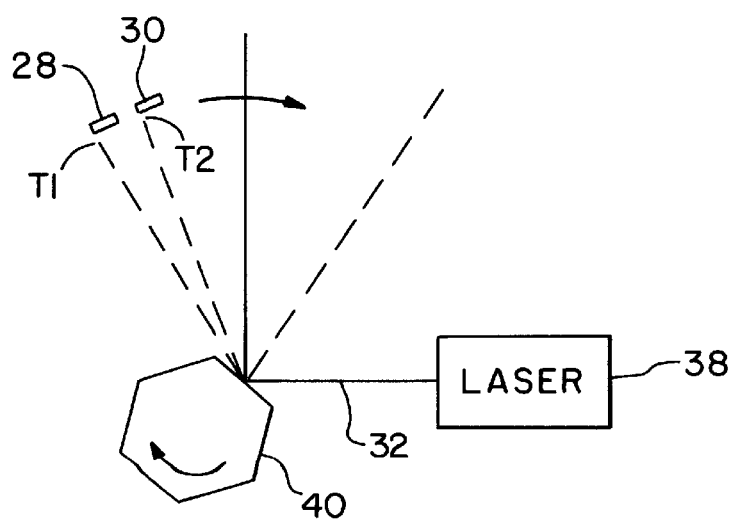
FIG. 3 is a simplified top view of the sensing arrangement of FIG. 2 and including a laser and rotating mirror.

In FIG. 2, a pair of optical sensors 28 and 30 extend obliquely to one another, each at an angle A to the bisector 36. The plane of FIG. 3 is orthogonal to that of FIG. 2. A beam 32 from laser 38 impinges rotating mirror structure 40 and sweeps in a repeated transverse scan path 34 as mirror structure 40 rotates. Laser beam 32 progresses along the transverse path 34 and is incident sensor 28 at time T1 and later impinges sensor 30 at time T2. The direction of scan is generally perpendicular to the bisector 36. After scanning past the sensors, the beam exits the printhead, impinges a photo conductive drum such as 22 and performs the image forming task. If, for example, the longitudinal (i.e., vertical or process direction) position of the scan line changes to that shown at 34', the beam impinges the sensor 28 at an earlier time T1' and strikes the second sensor 30 at a later time T2'. The reverse would result if the beam were raised.

The vertical sensitivity or change in signal vs. vertical position change depends on the angle (2A) between the sensors. Greater sensitivity can be achieved by increasing the angle, at the expense of lengthening both sensors or decreasing the vertical range. The angle is chosen to achieve a balance between sensor length which is directly related to cost, detection range, and sensitivity or accuracy.

Figure 4:
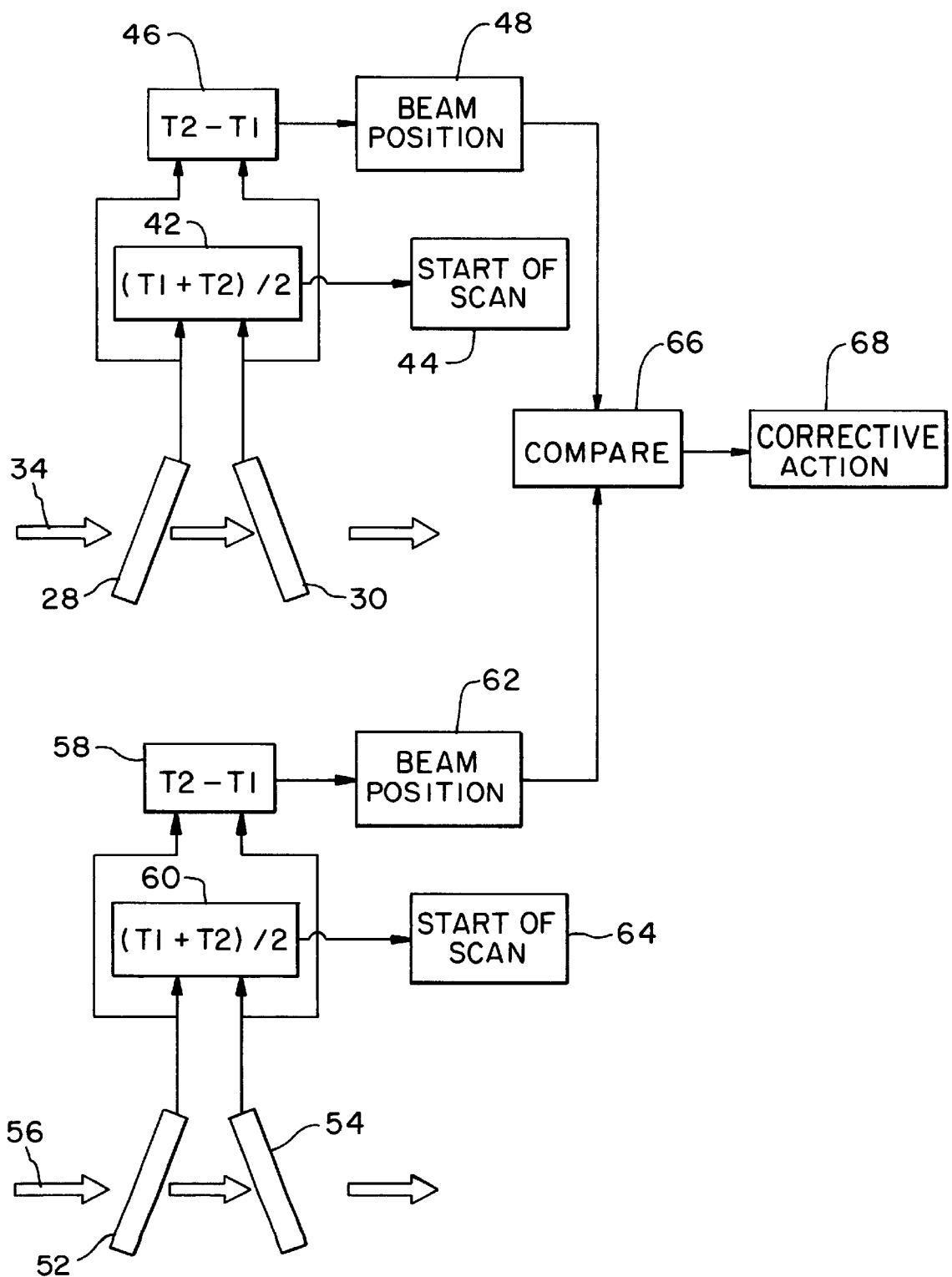
FIG. 4 is a schematic illustration of circuitry for determining laser beam positions utilizing the sensing arrangement of FIGS. 2 and 3.

FIG. 4 illustrates schematically the electrical circuitry for two laser printheads, each employing a laser beam which executes a scan pattern of repeated transverse scans along a corresponding line to form image information. There are two laser beam position sensing arrays for synchronizing operation of the printheads. Each position sensing array comprises first and second elongated laser light sensitive sensors 28 and 30, and 52 and 54 extending obliquely to one another and to the corresponding laser scan line, either 34 or 56. Circuit 46 responds to the time delay between the beam striking the first sensor 28 and the second sensor 30 to determine the longitudinal (process direction) coordinate of beam 34. Electrical circuit 42 responds to the average of the times required for the beam to reach the first and the second sensors 28 and 30 to determine a second beam coordinate. Typically, the second beam coordinate is an indication of when the beam reaches a start of scan location as indicated at 44. Similarly, the difference between the times T2 and T1 at which beam 56 impinges sensors 52 and 54 is determined at 58 and used to compute a measure of the longitudinal position of beam 56 as indicated at 62. The average of the two times T1 and T2 is determined at 60 and utilized to determine the start of scan 64. The beam positions 48 and 62 may be determined by a stored table look-up scheme. Such a table directly relates the time difference to the beam location for a particular sensor geometry. Other indications of position, even the time difference itself, may be employed. The two computed longitudinal beam positions 48 and 62 may then be compared by a comparator circuit 66 and a corrective action initiated at 68 if the compared positions differ by more than a predetermined or threshold amount. Replication of this circuitry may be made to accommodate the four printheads of FIG. 1. For example, one printhead may be taken as a reference and each of the others compared to and harmonized with this reference.

The harmonization or corrective action may involve changing the laser timing or the timing of the photo conductive drum such as 22. For example, assume one laser longitudinal scan line is too low as indicated by scan line 34'. Assume further that the drum surface on which the laser beam impinges is moving vertically relative to the sensors of FIG. 2. Under these conditions, the speed of the corresponding photo conductive drum may be slowed slightly to relocate the scan line 34' at the correct location on the drum. With the same assumptions, commencing the laser beam scan earlier accomplishes the same correction.

While this invention has been described as having a preferred design, the present invention can be further modified within the spirit and scope of this disclosure. For example, this invention may be incorporated in image forming apparatus other than a laser printer, to include electrophotographic devices, copy machines, laser scanners, etc. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In an image forming apparatus utilizing a laser beam which executes a scan pattern of repeated transverse scans along a longitudinal line to form images on recording media, a process of determining the start of scan and the longitudinal beam position, comprising the steps of:

determining the time at which is laser beam reaches a first surface; determining the time at which the laser beam reaches a second surface which second surface extends obliquely to the first surface;

averaging the two determined times to determine a start of scan reference time;

forming the difference between the two determined times, deriving, from the difference between the two determined times, the longitdinal beam position;

supplying a second laser beam;

determining the time at which the second laser beam reaches a third surface;

determining the time at which the second laser beam reaches a fourth surface, the fourth surface extending obliquely to the third surface;

averaging the two determined times at which the second laser beam reaches a third surface and a fourth surface, respectively, to determine a start of scan reference time;

forming the difference between the two determined times at which the second laser beam reaches a third surface and a fourth surface, respectively, deriving, from the difference between the two determined times at which the second laser beam reaches a third surface and a fourth surface, respectively, the longitudinal beam position of the second laser beam.

2. The process of claim 1, including the additional step of comparing the derived longitudinal beam positions.

3. The process of claim 2, including the further step of selectively correcting the apparatus to harmonize the compared beam positions.

* * * * *